(12) United States Patent
Zhao

(10) Patent No.: US 8,805,355 B2
(45) Date of Patent: Aug. 12, 2014

(54) METHOD FOR REDUCING FAILURE OF CONFIGURATION UPDATE INITIATED BY ENB AND ENB

(75) Inventor: Yi Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/576,824

(22) PCT Filed: Nov. 23, 2010

(86) PCT No.: PCT/CN2010/079013
§ 371 (c)(1),
(2), (4) Date: Aug. 2, 2012

(87) PCT Pub. No.: WO2011/147168
PCT Pub. Date: Dec. 1, 2011

(65) Prior Publication Data
US 2013/0059577 A1    Mar. 7, 2013

(30) Foreign Application Priority Data

May 25, 2010   (CN) .......................... 2010 1 0182732

(51) Int. Cl.
*H04W 24/00*     (2009.01)
*H04L 12/24*     (2006.01)
*H04W 24/04*     (2009.01)
*H04W 88/08*     (2009.01)

(52) U.S. Cl.
CPC .......... *H04L 41/082* (2013.01); *H04L 41/0681* (2013.01); *H04W 88/08* (2013.01); *H04W 24/04* (2013.01)
USPC .......................... 455/423; 455/422.1; 455/424

(58) Field of Classification Search
USPC ....................................... 455/422.1, 423, 424
See application file for complete search history.

(56) References Cited

U.S. PATENT DOCUMENTS

| 2008/0098467 A1* | 4/2008 | Miller et al. ....................... 726/5 |
| 2010/0098467 A1 | 4/2010 | Lee |
| 2012/0252436 A1* | 10/2012 | Ostrup et al. .............. 455/422.1 |

FOREIGN PATENT DOCUMENTS

| CN | 101198115 A | 6/2008 |
| CN | 101272614 A | 9/2008 |
| CN | 101415176 A | 4/2009 |

(Continued)

OTHER PUBLICATIONS

International Search Report for PCT/CN2010/079013 dated Feb. 23, 2011.

*Primary Examiner* — Charles Appiah
*Assistant Examiner* — Jaime Holliday
(74) *Attorney, Agent, or Firm* — Ling Wu; Stephen Yang; Ling and Yang Intellectual Property

(57) ABSTRACT

The present invention provides a method for reducing failure of configuration update initiated by an evolved Node B (eNB) and the eNB thereof. The method includes: after the configuration is updated, the eNB compares Public Land Mobile telephone Network (PLMN) information of the local end with the PLMN information of a Mobility Management Entity (MME) stored in the local end (101); when the PLMN information of the local end is completely consistent with the PLMN information of the MME stored by the local end, the eNB sends a configuration update request to the MME (102); or, when they are partially consistent, the eNB sends a configuration update request to the MME and alarms (103); or, when the PLMN information of the local end is completely inconsistent with the PLMN information of the MME stored in the local end, the eNB alarms (104).

6 Claims, 2 Drawing Sheets

(56) References Cited

FOREIGN PATENT DOCUMENTS

| JP | 2006333083 A | 12/2006 |
| JP | 2007535229 A | 11/2007 |
| JP | 2008301086 A | 12/2008 |
| JP | 2010087913 A | 4/2010 |
| WO | 2010006692 A1 | 1/2010 |

* cited by examiner

METHOD FOR REDUCING FAILURE OF CONFIGURATION UPDATE INITIATED BY ENB AND ENB

TECHNICAL FIELD

The present invention relates to the field of mobile communications, and more especially, to a method for reducing failure of configuration update initiated by an eNB and the eNB thereof.

BACKGROUND OF THE RELATED ART

Refer to FIG. 1, in the LTE (Long Term Evolution) system, after the eNB (evolved Node B) 10 and the MME (Mobility Management Entity) 20 establish the Si (an interface connecting the MME20 and the eNB 10 in the LTE system) connection, the eNB 10 and the MME20 save the related information of the peer end respectively to be used afterwards. When the configuration of the eNB10 is changed, the eNB10 notifies the MME20 of the latest configuration of eNB10 through the ENB Configuration Update message so that the MME20 may timely update the saved configuration of the eNB10. If the MME20 accepts the configuration update information of the eNB10, the MME20 sends a response message of ENB CONFIGURATION UPDATE ACKNOWLEDGE to the eNB10 to notify the eNB10 that the configuration update is successful, and the MME20 will use the latest configuration of the eNB10 afterwards, otherwise, the eNB10 sends a response message of ENB CONFIGURATION UPDATE FAILURE to notify the eNB10 that the configuration update fails, and the MME20 still uses the old configuration of the ENB10.

In the practical application process, however, the failure of the configuration update process initiated by the eNB10 is often due to the improper parameter configuration. Before the eNB10 initiates the configuration update request, it does not judge whether the MME20 supports the configuration parameters of the eNB10 or not, while directly sends this configuration update request, thereby increasing the failure rate of configuration update.

SUMMARY OF THE INVENTION

The main purpose of the present invention is to provide a method for reducing the failure of configuration update initiated by the eNB and the eNB thereof to reduce the failure rate of the configure update initiated by the eNB.

The present invention provides a method for reducing failure of configuration update initiated by an eNB (evolved Node B), comprising the steps:

after a configuration of the eNB is updated, the eNB comparing Public Land Mobile Network (PLMN) information of a local end with the PLMN information of a Mobility Management Entity (MME) saved in the local end;

when the PLMN information of the local end is completely consistent with the PLMN information of the MME saved in the local end, the eNB sending a configuration update request to the MME; or when the PLMN information of the local end is partially consistent with the PLMN information of the MME saved in the local end, the eNB sending a configuration update request to the MME and alarming; or when the PLMN information of the local end is completely inconsistent with the PLMN information of the MME saved in the local end, the eNB alarming.

Preferably, the PLMN information is PLMN Identity information.

Preferably, the step of the eNB alarming is specifically that the eNB displaying alarm information, and the alarm information prompts parameters which are not consistent in the PLMN information of the eNB and in the PLMN information of the MME.

Preferably, the configuration update request is specifically a request that the eNB notifies the MME of the updated configuration.

Preferably, after the eNB sends the configuration update request to the MME, the method also comprises the following step:

said MME sending a response message to the eNB to notify the eNB whether the configuration update is successful or not.

The present invention also provides an eNB which is used to compare Public Land Mobile Network (PLMN) information of a local end with the PLMN information of the Mobility Management entity (MME) saved in the local end after configuration of the local end is updated; and is used to when the PLMN information of the local end is completely consistent with the PLMN information of the MME saved in the local end, send a configuration update request to the MME; or when the PLMN information of the local end is partially consistent with the PLMN information of the MME saved in the local end, send a configuration update request to the MME and alarm; or when the PLMN information of the local end is completely inconsistent with the PLMN information of the MME saved in the local end, alarm.

Preferably, the PLMN information is PLMN Identity information.

Preferably, the eNB is specifically used to display alarm information, and the alarm information prompts parameters which are not consistent in the PLMN information of the eNB and in the PLMN information of the MME.

Preferably, the configuration update request is specifically a request used by the eNB to notify the MME of the updated configuration.

Preferably, the eNB is also used to received the response message from the MME after sending the configuration update request to the MME, and the response message prompts whether the configuration update is successful or not.

By the method for reducing the failure of configuration update initiated by the eNB and the eNB provided in the present invention, it can be determined that the MME does not support the configuration parameters of the eNB according to the MME related information stored in the eNB before the eNB initiates the configuration update request to the MME, and thus this configuration update request may not be sent, meanwhile an alarm prompt is given to the user, thereby improving the success rate of the configuration update.

PREFERRED EMBODIMENTS OF THE PRESENT INVENTION

Figure 1:
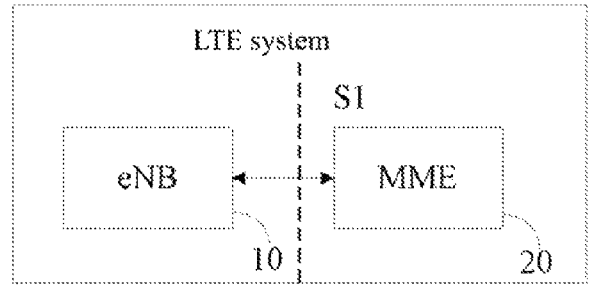
FIG. 1 is a structural diagram of the existing LTE system.
Figure 2:
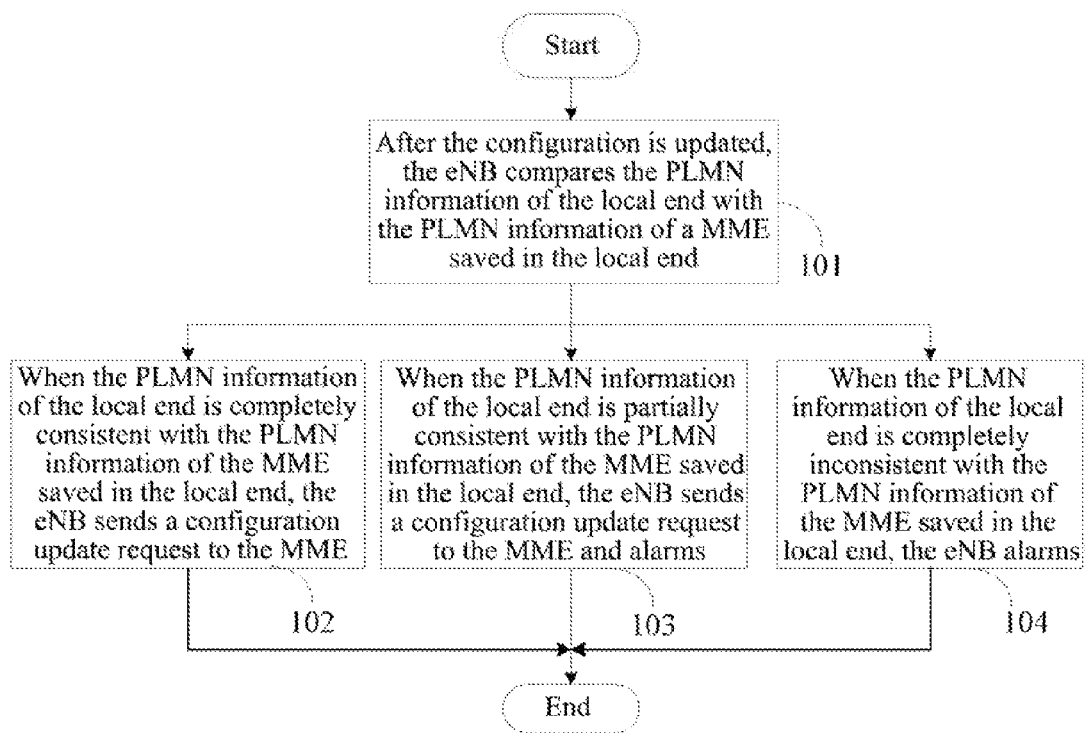
FIG. 2 is a flow chart of an embodiment of the method for reducing the failure of configuration update initiated by the eNB in the present invention.

By the method for reducing the failure of configuration update initiated by the eNB and the eNB provided in the present invention, it can be determined that the MME does not support the configuration parameters of the eNB according to the MME related information stored in the eNB before the eNB initiates the configuration update request to the MME, and thus this configuration update request may not be sent, meanwhile an alarm prompt is given to the user, thereby improving the success rate of the configuration update. Refer to FIG. 2, it provides an embodiment of the method for reducing the failure of the configuration update initiated by the eNB in the present invention, comprising:

step 101, after the configuration is updated, the eNB compares the PLMN (Public Land Mobile Network) information of the local end with the PLMN information of a MME (Mobility Management Entity) saved in the local end;

step 102, when the PLMN information of the local end is completely consistent with the PLMN information of the MME saved in the local end, the eNB sends a configuration update request to the MME; or step 103, when the PLMN information of the local end is partially consistent with the PLMN information of the MME saved in the local end, the eNB sends a configuration update request to the MME and alarms; or step 104, when the PLMN information of the local end is completely inconsistent with the PLMN information of the MME saved in the local end, the eNB alarms.

The aforementioned PLMN information is the PLMN Identity information.

The aforementioned step of eNB alarming is specifically that the eNB displaying the alarm information, and the alarm information prompts parameters which are not consistent in the PLMN information of the eNB and in the PLMN information of the MME.

The aforementioned configuration update request is specifically the request used by the eNB to notify the MME of the updated configuration.

Figure 3:
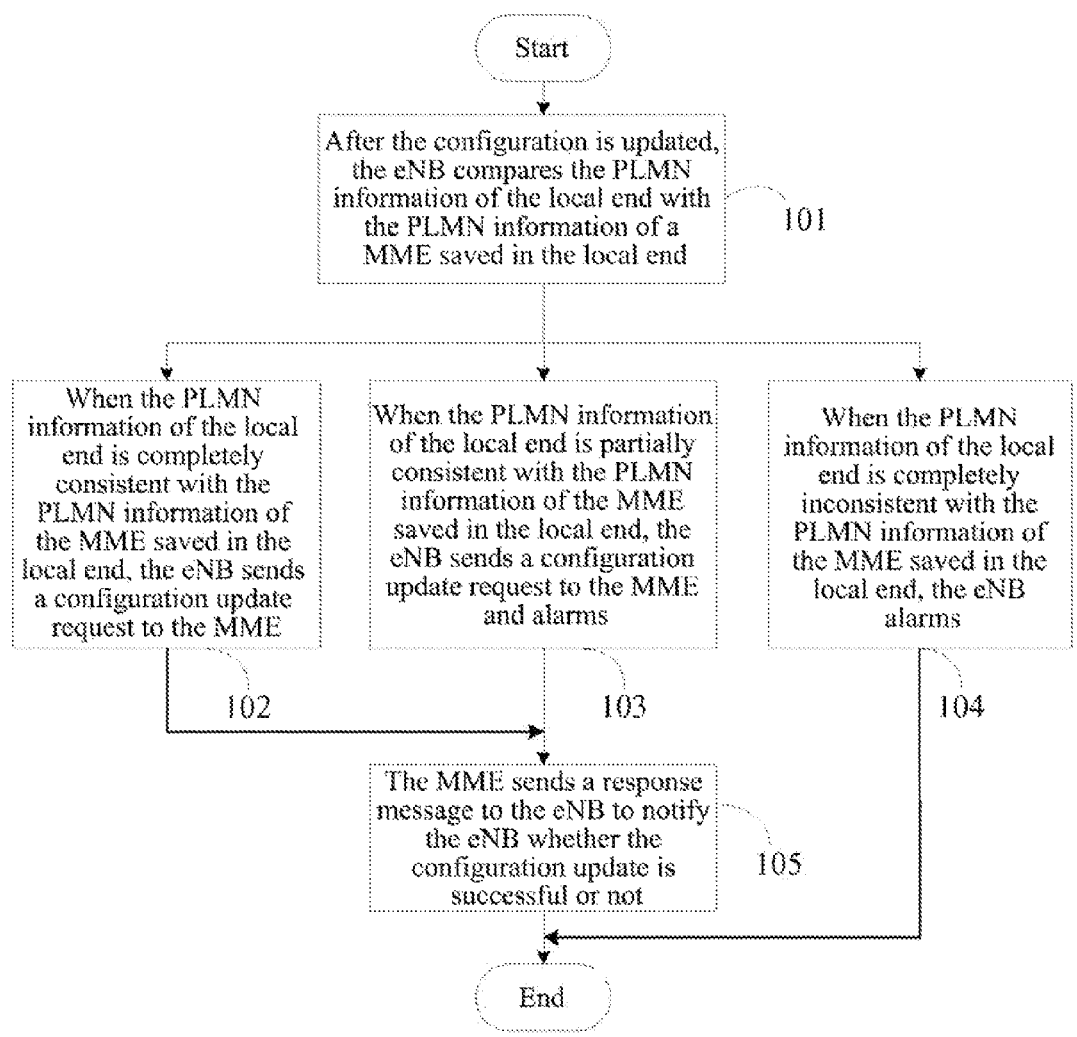
FIG. 3 is a flow chart of another embodiment of the method for reducing the failure of configuration update initiated by the eNB in the present invention.

Refer to FIG. 3, it provides another embodiment of the method for reducing the failure of the configuration update initiated by the eNB in the present invention, after the eNB in the aforementioned embodiment sends the configuration update request to the MME, the method also comprises:

step 105, the MME sends a response message to the eNB to notify the eNB whether the configuration update is successful or not.

With combination of the accompanying drawings, the working process of the aforementioned embodiment will be described in detail.

Suppose the PLMN Identity information of the tracking area supported by the eNB is: 64f010, and the PLMN Identity information supported by the MME connected with the eNB is: 64f010 and 64f020.

Case 1: the Identity information in the tracking area supported by the eNB is consistent with the PLMN Identity information supported by the MME.

After the operator updates the eNB configuration, the PLMN Identity information supported in the tracking area of the local eNB becomes: 64f010, 64f020.

After the configuration is updated, the eNB checks whether each PLMN Identity supported in its own tracking area exists in the list of PLMN Identity Information (64f010, 64f020) supported by the MME connected with the eNB or not, and the list is stored in the eNB.

Herein, the judgment result is that the MME supports all the PLMN Identity information in the tracking area after the local eNB updates the configuration.

The eNB encodes the updated configuration information of the eNB into the ENB Configuration Update request information and sends it to the MME.

The MME sends a response message to the eNB to notify the eNB whether the configuration update is successful or not.

Case 2: the PLMN Identity information in the tracking area supported by the eNB is completely inconsistent with the PLMN Identity information supported by the MME.

After the operator updates the configuration of the eNB, the PLMN Identity information supported by the eNB in the tracking area becomes: 64f030, 64f040.

After the configuration is updated, the eNB checks whether each PLMN Identity supported in its tracking area exists in the list of PLMN Identity Information (64fD10, 64f020) supported by the MME connected with the eNB or not, and the list is stored in the eNB.

Herein, when the judgment result is that the MME does not support any PLMN Identity information in the supported tracking area after the eNB updates the configuration.

The eNB sends alarm information, and alarms the operator of the PLMN Identity Information (64f030, 64f040) not supported by the MME, meanwhile, it does not send the ENB Configuration Update request to the MME.

Case 3: the PLMN Identity information in the tracking area supported by eNB is partially consistent with the PLMN Identity information supported by the MME.

After the operator updates the configuration, the PLMN Identity information supported in the local eNB tracking area becomes: 64f030, 64f040.

After the configuration is updated, the eNB checks whether each PLMN Identity supported in its tracking area exists in the list of the PLMN Identity Information (64fD10, 64f020) supported by the MME connected with the eNB or not, and the list is stored in the eNB.

Herein, the judgment result is that the MME partially supports the PLMN Identity information in the tracking area supported by the eNB after the eNB updates the configuration.

The PLMN Identity Information (64f040) that is not supported by the MME is given by an alarm prompt to the operator, and the eNB encodes the configuration information updated by the local eNB into the ENB Configuration Update request information and sends it to the MME.

The MME sends a response message to the eNB to notify the eNB whether the configuration update is successful or not.

The method for reducing the failure of the configuration update initiated by the eNB provided in the present invention reduces the failure rate of the configuration update initiated by the eNB.

The present invention also provides an eNB, and the eNB is used to, after the configuration is updated, compare the PLMN information of the local end with the PLMN information of the MME stored in the local end;

when the PLMN information of the local end is completely consistent with the PLMN information of the MME saved in the local end, send a configuration update request to the MME; or when the PLMN information of the local end is partially consistent with the PLMN information of the MME saved in the local end, send a configuration update request to the MME and alarm; or when the PLMN information of the local end is completely inconsistent with the PLMN information of the MME saved in the local end, alarm.

Wherein, the PLMN information is the PLMN Identity information.

Wherein, the eNB is specifically used to display the alarm information, and the alarm information prompts the parameters which are not consistent in the PLMN information of the eNB and in the PLMN information of the MME.

The configuration update request is specifically the request used by the eNB to notify the MME of the updated configuration.

The present invention also provides another embodiment of the eNB, the eNB based on the aforementioned embodiment is also used to receive the response message of the MME, and the response message prompts whether the configuration update is successful or not.

In the following, the working process of the eNB in the present invention will be described.

Suppose in the tracking area supported by the eNB, the PLMN Identity information supported by the eNB is: 64f010, and the PLMN Identity information supported by the MME connected with the eNB is: 64f010 and 64f020.

Case 1: the Identity information in the tracking area supported by by eNB is consistent with the PLMN Identity information supported by the MME.

After the operator updates the eNB configuration, the PLMN Identity information supported in the tracking area of the local eNB becomes: 64f010, 64f020.

After the configuration is updated, the eNB checks whether each PLMN Identity supported in its own tracking area exists in the list of PLMN Identity Information (64f010, 64f020) supported by the MME connected with the eNB or not, and the list is stored in the eNB.

Herein, the judgment result is that the MME supports all the PLMN Identity information in the tracking area after the local eNB updates the configuration.

The eNB encodes the updated configuration information of the eNB into the ENB Configuration Update request information and sends it to the MME.

The eNB receives a response message from the MME, and the response message prompts whether the configuration update is successful or not.

Case 2: the PLMN Identity information in the tracking area supported by the eNB is completely inconsistent with the PLMN Identity information supported by the MME.

After the operator updates the configuration of the eNB, the PLMN Identity information supported by the eNB in the tracking area becomes: 64f030, 64f040.

After the configuration is updated, the eNB checks whether each PLMN Identity supported in its tracking area exists in the list of PLMN Identity Information (64fD10, 64f020) supported by the MME connected with the eNB or not, and the list is stored in the eNB.

Herein, when the judgment result is that the MME does not support any PLMN Identity information in the supported tracking area after the eNB updates the configuration.

The eNB sends alarm information, and alarms the operator of the PLMN Identity Information (64f030, 64f040) not supported by the MME, meanwhile, it does not send the ENB Configuration Update request to the MME.

Case 3: the PLMN Identity information in the tracking area supported by eNB is partially consistent with the PLMN Identity information supported by the MME.

After the operator updates the configuration, the PLMN Identity information supported in the local eNB tracking area becomes: 64f030, 64f040.

After the configuration is updated, the eNB checks whether each PLMN Identity supported in its tracking area exists in the list of the PLMN Identity Information (64fD10, 64f020) supported by the MME connected with the eNB or not, and the list is stored in the eNB.

Herein, the judgment result is that the MME partially supports the PLMN Identity information in the tracking area supported by the eNB after the eNB updates the configuration.

The PLMN Identity Information (64f040) that is not supported by the MME is given by an alarm prompt to the operator, and the eNB encodes the configuration information updated by the local eNB into the ENB Configuration Update request information and sends it to the MME.

The eNB receives a response message from the MME, and the response message prompts whether the configuration update is successful or not.

The eNB provided in the present invention reduces the failure rate of the initiated configuration update.

The above description is only the preferred embodiments of the present invention and does not limit the patent scope of the present invention, any equivalent structure or equivalent process modification used according to the contents of the specification and accompanying drawings in the present invention, no matter whether it is directly or indirectly used in any other related technical field, should be included within the protection scope of the present invention.

What is claimed is:

1. A method for reducing failure of configuration update initiated by an evolved Node B (eNB), comprising the steps:
   the eNB storing Public Land Mobile Network (PLMN) identities of a Mobility Management Entity (MME) to which the eNB connects;
   after a configuration of the eNB is updated, the eNB comparing PLMN identities of the eNB with the PLMN identities of the MME stored in the eNB;
   when the eNB determines that all the PLMN identities of the eNB are completely consistent with all the PLMN identities of the MME stored in the eNB, the eNB sending a configuration update request to the MME;
   when the eNB determines that at least one PLMN identity of the eNB is not consistent with any one of the PLMN identities of the MME stored in the eNB, the eNB sending a configuration update request to the MME and alarming;
   when the eNB determines that all the PLMN identities of the eNB are completely inconsistent with all the PLMN identities of the MME stored in the eNB, the eNB alarming;
   wherein, the step of the eNB alarming is specifically that the eNB displaying alarm information, and the alarm information prompts parameters which are not consistent in the PLMN identities of the eNB and in the PLMN identities of the MME stored in the eNB.

2. The method for reducing the failure of the configuration update initiated by the eNB of claim 1, wherein, the configuration update request is specifically a request that the eNB notifies the MME of the updated configuration.

3. The method for reducing the failure of the configuration update initiated by the eNB of claim 1, wherein, after the eNB sends the configuration update request to the MME, the method also comprises the following step:
   said MME sending a response message to the eNB to notify the eNB whether the configuration update is successful or not.

4. An evolved NodeB (eNB), wherein, the eNB is configured to store Public Land Mobile Network (PLMN) identities of a Mobility Management Entity (MME) to which the eNB connects, compare PLMN identities of the eNB with the PLMN identities of the MME stored in the eNB after a configuration of the eNB is updated; and is configured to:
   when the eNB determines that all the PLMN identities of the eNB are completely consistent with all the PLMN identities of the MME stored in the eNB, send a configuration update request to the MME;

when the eNB determines that at least one PLMN identity of the eNB is not consistent with any one of the PLMN identities of the MME stored in the eNB, send a configuration update request to the MME and alarm;

when the eNB determines that all the PLMN identities of the eNB are completely inconsistent with all the PLMN identities of the MME stored in the eNB, alarm;

wherein, the eNB is specifically configured to display alarm information, and the alarm information prompts parameters which are not consistent in the PLMN identities of the eNB and in the PLMN identities of the MME stored in the eNB.

5. The eNB of claim 4, wherein, the configuration update request is specifically a request used by the eNB to notify the MME of the updated configuration.

6. The eNB of claim 4, wherein, the eNB is further configured to receive a response message from the MME, wherein, the response message indicates whether the configuration update is successful or not.

* * * * *